May 4, 1926.

A. F. WELCH

DISHWASHER

Filed Sept. 1, 1922

1,583,710

Inventor
Alfred F. Welch,
By
His Attorney.

Patented May 4, 1926.

1,583,710

UNITED STATES PATENT OFFICE.

ALFRED F. WELCH, OF FORT WAYNE, INDIANA.

DISHWASHER.

Application filed September 1, 1922. Serial No. 585,660.

*To all whom it may concern:*

Be it known that I, ALFRED F. WELCH, a citizen of the United States, residing at Fort Wayne, in the county of Allen, State of Indiana, have invented certain new and useful Improvements in Dishwashers, of which the following is a specification.

The present invention relates to dish washers and especially to dish washers which are more particularly intended for domestic use although it is not necessarily limited thereto.

The primary object of my invention is to provide an improved dish washer which is simple in structure, efficient in operation, easy to use, occupies little space, and can be manufactured and sold at a low cost, and for a consideration of what I believe to be novel and my invention, attention is directed to the accompanying description and the claims appended thereto.

Figure 1:
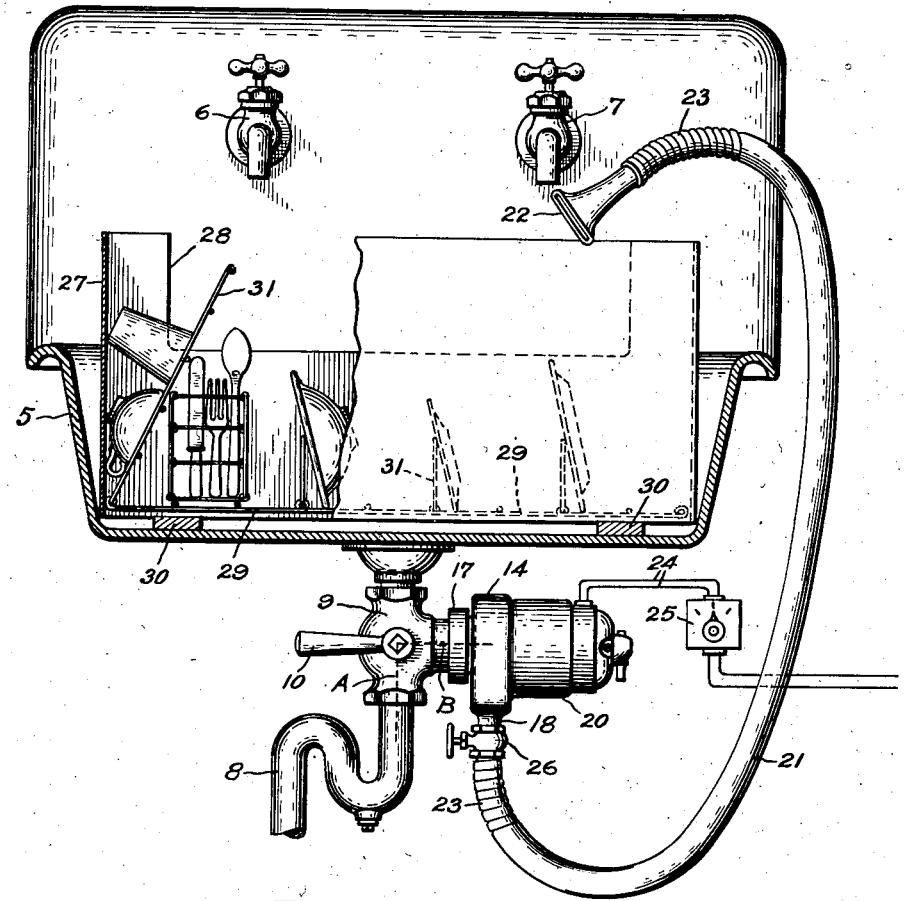
Figure 2:
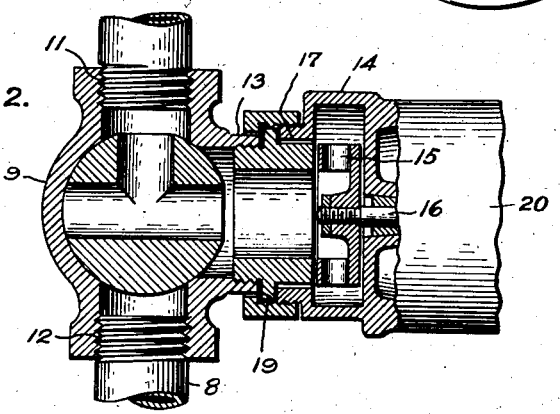

In the drawing, Fig. 1 is a front view partly in section and partly broken away of dish washing apparatus embodying my invention and Fig. 2 is a sectional view of a valve mechanism.

Referring to the drawing, 5 indicates an ordinary kitchen sink provided with a hot water faucet 6 and a cold water faucet 7. Connected to the bottom of the sink is a drain pipe 8 which leads to a sewer or other point for the discharge of waste water. The sink as shown is only by way of example and is to be taken as typical of any ordinary or usual sink structure.

According to my invention I provide in the drain pipe 8 a three-way valve 9 having an operating handle 10. The valve casing is provided with top and bottom openings 11 and 12 into which the drain pipe ends are suitably connected as by being threaded into them, and with a side opening 13. At 14 is indicated a small pump, here shown in the form of a centrifugal pump having an impeller 15 carried by a shaft 16. The pump casing has a suction opening 17 and a discharge opening 18. The suction opening 17 of the pump is connected to side opening 13 of valve 9 by means of a suitable coupling 19, the coupling being preferably a rigid one so that the valve structure and pump form in substance a unitary structure. The pump may be driven by any suitable means but I prefer to drive it by means of a small electric motor indicated at 20. Preferably the motor casing and pump casing are formed as an integral structure so that when the pump casing is connected to the valve casing there is provided a complete unit. Shaft 16 is the motor shaft, impeller 15 being carried on an overhung end of it.

Connected to discharge opening 18 of the pump is a flexible hose 21 having a tool at its end such as the nozzle 22. The hose is shown as being provided with coiled wire means 23 at its two ends to prevent it from kinking. The nozzle 22 is detachably connected to the end of the hose and may be replaced by other suitable cleaning tools, such as brushes, scrapers or the like. It is preferably formed of some non-metallic material which is a poor conductor of heat, or is covered with a heat-insulating material to prevent burning the hands of the operator when in use. The discharge end of the nozzle has a narrow, oblong opening so as to discharge a flat, wide sheet of water.

The motor is provided with lead wires 24 for connecting it to a source of electrical energy, and with a control switch 25, the latter having preferably a number of switch points whereby the speed of the motor may be controlled. In the present instance, three points are indicated which may represent "off", "full speed" and an "intermediate speed". By this means the amount of water pumped by the pump may be varied. In addition to the three-point switch for regulating the pump or in lieu thereof, I may provide a valve 26 in discharge pipe 18.

For use in the sink I provide a rack or basket for holding the dishes to be washed. It may be of any suitable structure. In the present instance it is shown as comprising a rectangular metallic frame 27 of a size to fit in sink 5. The sides and ends of the frame are of solid material, one side being cut away as indicated at 28 to provide a passage for the faucets when the rack or basket is being put into or removed from the sink. The rack is provided with a wire mesh bottom 29 and with bottom cleats 30 which rest on the bottom of the sink and hold the bottom of the rack in spaced relation to the bottom of the sink. In the rack or basket are suitable transversely-extending wires or partitions 31 against which the dishes may be stacked. These partitions serve to hold the dishes to be washed in position, such that water can be directed against all their surfaces by nozzle 22.

The normal position of valve handle 10 is that indicated by the dotted line A. In this position valve openings 11 and 12 are connected with drain 8 and valve opening 13 is closed. The sink is then connected to the drain in the usual manner. This position of the valve would be obtained by turning it through an angle of ninety degrees in an anti-clockwise direction from the position shown in Fig. 2. When the valve is turned ninety degrees in a clockwise direction from normal position, it assumes the position shown in the drawing, the drain being closed and the sink connected to the suction side of pump 14. When the valve is turned ninety degrees in an anti-clockwise direction from normal position so that handle 10 assumes the position represented by the dotted line B (Fig. 1) the sink is then disconnected from the drain pipe and the suction side of the pump is connected thereto.

In use the dishes to be washed are stacked in the rack or basket, being set on edge after the manner illustrated in the drawing so all the surfaces can be reached with the water. Either before or after the dishes are stacked in it, the rack is placed in the sink as shown in Fig. 1. Valve 9 is turned to disconnect the sink from the drain and connect it to the pump casing, i. e., to the position shown in the drawing, and a suitable quantity of hot water is put into the sink, soap being added as desired. The operator then starts the motor. This runs the pump which pumps water out of the sink and discharges it through nozzle 22. The operator holds the nozzle in the hand and by directing the stream of water from the nozzle onto the dishes washes them. The nozzle, being oblong, disharges a flat sheet of water and by playing this over the dishes they are quickly cleansed.

As will be clear, the water pumped from the sink is discharged back into it again by the nozzle so the same water is used repeatedly until the operator has the dishes clean. This makes the device economical of water and soap and enables the operator to spray the water over the dishes until they are thoroughly cleansed. After the dishes are washed, the operator stops the motor and turns valve 9 to normal position so as to connect the sink to the drain, so the used water in the sink can run out. The valve may be then turned to the position indicated by the dotted line B if desired, so as to connect the pump casing to the drain to permit the used water in the hose to run out. The valve is then turned back to the position shown in the drawing, hot water put in the sink for rinsing and the motor again started. The pump pumps the hot water through the hose and out nozzle 22 and by spraying it over the dishes the operator rinses them. If the operator has no further use for the water it may be drained away in the manner already described and the dishes left to dry which they will do very quickly if the water used is hot. However, if the operator has other articles to wash, pots and pans for example, the rack or basket may be lifted from the sink and the hot rinse water used for washing the other articles. If found desirable, the spray nozzle 22 may be replaced by suitable scrapers or brushes to wash the pots and pans. After the utensils are all washed the water is drained from the sink and hose in the manner already described, the valve being finally left in normal position which leaves the sink connected to the drain. For washing pots and pans it is usually desirable to use a slower flow of water than for dishes and to accomplish this the motor may be run at a lower speed by setting the switch for intermediate speed, or valve 26 may be partially closed, or both expedients used. When not in use, the rack or basket which is preferably arranged to be folded up or collapsed, is put away and the hose is hung under the sink on a suitable hook or other type of support.

The walls of frame 27 are made of sufficient height to prevent water being spilled or splashed on the floor when the apparatus is being used.

My improved dish washing apparatus is simple in structure, comprises few parts and is not likely to get out of order. The motor, pump and valve structure being located under the sink are out of the way and occupy space not used ordinarily for any purpose. In other words, they may be said to occupy waste space. This is a thing of considerable importance in many instances because of limited kitchen space. The apparatus is easily installed and is preferably placed close up to the bottom of the sink. The motor, pump and valve form a single unitary structure. The only operation required in installing the apparatus is to connect the valve into the drain pipe of an ordinary kitchen sink such as is found in most kitchens. The entire apparatus is supported from the sink, it being comparatively light so no other supports are necessary. Since the apparatus comprises few parts and is simple in structure it can be built and sold at a low cost.

My dish washer has the advantage in use that the operator can see the dishes or other articles being washed and can direct the spray of water from the nozzle against each piece until it is thoroughly cleansed.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a kitchen sink having a drain opening, of a drain pipe, a pump, a length of hose connected to the discharge side of the pump, and valve means for connecting said drain opening to either the suction side of the pump or to the drain pipe.

2. The combination with a sink having a drain opening and a drain pipe connected to said opening, of a multiway valve mounted directly in said pipe, a pump mounted on said valve with its suction opening in direct communication with one of the valve openings, and a motor for driving said pump, said valve when in one position blocking off communication between said drain opening and the suction opening of the pump and when in another position blocking off the drain pipe and connecting the drain opening directly to the suction opening of the pump.

3. A structure for use with a sink having a drain pipe to convert it into a dish washer, said structure comprising a multiway valve having three openings, a pump directly connected to said valve with its suction opening directly communicating with one of said valve openings, whereby the suction opening of said pump may be completely closed by said valve when the valve is in one position, and an electric motor dircetly connected to the pump and supported thereby.

4. The combination with a sink having a drain opening and a drain pipe connected to it, said sink being adapted to receive a rack holding articles to be washed, of a pump, means for disconnecting the drain pipe from said opening and connecting the suction side of the pump thereto, a length of hose connected to the discharge side of the pump, said hose being of such length that water can be directed from it against articles in said rack, and means for driving said pump.

In witness whereof, I have hereunto set my hand this 24th day of August, 1922.

ALFRED F. WELCH.